United States Patent
Stephenson

(10) Patent No.: US 6,866,835 B1
(45) Date of Patent: Mar. 15, 2005

(54) ENERGY PRODUCTION, STORAGE AND DELIVERY SYSTEM

(75) Inventor: Neville Charles Stephenson, West Cambewarra (AU)

(73) Assignee: Protegy Limited, Central (HK)

( * ) Notice: Subject to any disclaimer, the term of this patent is extended or adjusted under 35 U.S.C. 154(b) by 0 days.

(21) Appl. No.: 09/959,902

(22) PCT Filed: May 12, 2000

(86) PCT No.: PCT/AU00/00446

§ 371 (c)(1),
(2), (4) Date: Mar. 11, 2002

(87) PCT Pub. No.: WO00/70699

PCT Pub. Date: Nov. 23, 2000

(30) Foreign Application Priority Data

May 12, 1999 (AU) .............................. PQ0298

(51) Int. Cl.$^7$ .............................. C01B 3/08; C25B 1/02; H01M 8/06; H01M 8/08
(52) U.S. Cl. .................. 423/657; 423/658.2; 429/19; 429/46
(58) Field of Search .............................. 423/648.1, 657, 423/658.2; 429/19, 46

(56) References Cited

U.S. PATENT DOCUMENTS

| | | |
|---|---|---|
| 4,155,712 A | 5/1979 | Taschek |
| 4,218,520 A | 8/1980 | Zaromb |
| 4,369,234 A | 1/1983 | Zaromb |
| 4,650,660 A | 3/1987 | Harris |
| 4,730,601 A * | 3/1988 | Hubele et al. ......... 126/263.02 |
| 5,286,473 A | 2/1994 | Hasebe et al. |
| 5,514,353 A | 5/1996 | Adlhart |
| 5,817,157 A | 10/1998 | Checketts |

FOREIGN PATENT DOCUMENTS

| | | |
|---|---|---|
| CA | 2051859 | 3/1992 |
| EP | 055330 | 7/1982 |
| EP | 084815 | 3/1983 |
| EP | 806498 | 8/2001 |
| GB | 2142423 | 1/1985 |
| JP | 9-176885 | 7/1997 |

* cited by examiner

*Primary Examiner*—Stanley S. Silverman
*Assistant Examiner*—Maribel Medina
(74) *Attorney, Agent, or Firm*—Leydig, Voit & Mayer, Ltd.

(57) ABSTRACT

The invention relates to a system having an inorganic chemical system defined by an electronegative half cell reaction producing hydrogen, a first electropositive half cell having a sufficient potential to drive the electronegative half cell reaction; and a second electropositive half cell reaction. The electropositive half cell reactions are selected to increase the amount or rate of hydrogen and/or energy production. The invention also relates to a method of working the cell and the use of the cell for energy storage and distribution.

23 Claims, 2 Drawing Sheets

ENERGY PRODUCTION, STORAGE AND DELIVERY SYSTEM

TECHNICAL FIELD

The present invention relates to an energy production, storage and delivery system providing a non-polluting source of energy from water in the form of hydrogen and heat.

BACKGROUND ART

A variety of energy sources are presently available, such as nuclear, solar, hydroelectric, geothermal, wind and tidal power. However, by far the most common and convenient sources of energy at present are those based on the combustion of carbonaceous products. For example, coal, gas, coke, wood, petroleum and diesel. By necessity, when such carbonaceous products burn they produce oxides of carbon, most notably $CO_2$.

$CO_2$ has become notorious as a "greenhouse" gas and the 1997 Kyoto protocol aims to reduce the level of such greenhouse gases and ultimately minimise the extent of global warming and its consequences.

The use of Hydrogen as a fuel represents an attractive alternative.

Fuel cells convert hydrogen directly into electrical energy by reactions which involve the reforming of hydrogen rich organic compounds (such as methane and methanol) by means of steam, catalysis, elevated temperatures and the like. Fuel cells operate by the direct conversion of chemical energy in a fuel to electrical energy without an intermediate combustion change. They represent the principal next generation source of mass energy production and are poised to make a significant contribution to power generation. However, these fuel cells suffer from the disadvantage that they all produce oxides of carbon, such as CO or $CO_2$, when using reformed organics as their hydrogen source.

On the earth, free or uncombined hydrogen is rare. It is commonly found in a combined form such as water, hydrocarbons and all plant and animal matter. In producing elemental hydrogen, the primary considerations are usually cost and convenience. In the laboratory, pure hydrogen is usually made by the reaction of a suitable metal with a displacement acid or by the electrolysis of water. For commercial hydrogen the primary sources are water and hydrocarbons. These endothermic processes require energy.

Molecular hydrogen is an important source of energy, as evidenced by the endothermic nature of its production. Its internal energy can be released either by combustion or by reaction with oxygen in a fuel cell.

However, the combustion of hydrogen gas directly produces no oxides of carbon-clean combustion produces theoretically only pure water.

The electronic and dehydrogenation process mentioned above for the production of molecular hydrogen produce by-products which may be unwanted. Electrolysis produces oxygen, which is useful, but dehydrogenation of organic compounds produces carbon dioxide, a global warming gas. These processes also require considerable energy input from external sources.

Attempts have been made to produce pure molecular hydrogen by self sustaining exothermic reactions. Conventional hydrogen generators are described in U.S. Pat. No. 4,463,063 and refer to the reaction of metal hydrides with water and the use of extruded electropositive metal anodes which gradually dissolve in the electrolytes, to provide electrons for discharge at inert cathodes.

In all of these instances the resulting compounds apart from the hydrogen produced, are regarded as waste, with problems associated with their collection and disposal.

Pure hydrogen can be liberated from water according to the following half cell equation:

$$2H_2O + 2e^- \rightarrow 2OH^- + H_2 \quad E_0 = -0.828.$$

In theory, any electropositive system with an $E_0$ value greater than 0.828 V can react with water to produce hydrogen. Examples of such electropositive systems with $E_0$ values above 0.828 V include hydrides, for example:

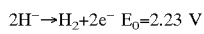
$$2H^- \rightarrow H_2 + 2e^- \quad E_0 = 2.23 \text{ V}$$

Although reactions of metals to produce hydrogen such as that given by:

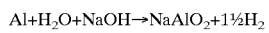
$$Al + H_2O + NaOH \rightarrow NaAlO_2 + 1\tfrac{1}{2}H_2$$

are chemically feasible, they are kinetically very slow and the hydrogen is produced at a slow rate over a long period. This "trickle" of hydrogen is unsatisfactory for commercial use.

It is desirable therefore to maximise not only the amount of hydrogen produced by a cell, but also the speed of hydrogen production.

More recent inventions in the field disclose generators for the production of hydrogen from methanol (U.S. Pat. Nos. 5,172,052 and 5,885,727). However, a by-product of the said reaction is carbon monoxide which is adsorbed by the catalyst, causing "catalyst poisoning", which refers to the deterioration of the catalytic function of the electrode, and subsequent lowering in the energy efficiency of the system. In order to minimise this problem, such generators must necessarily be equipped with means for measuring the carbon monoxide concentration in the system as well as means for decreasing it.

Other recent inventions in this field concentrate on the delivery of the reagents into the cell (eg U.S. Pat. No. 5,817,157, U.S. Pat. No. 5,514,353). It will be understood that the above citations are not indicative of the state of the common general knowledge.

The transport and storage of energy and fuel are also often problematic. The direct transference of electricity results in substantial losses of energy when the electricity is transmitted over long distances. Large infrastructure investments are also required for electricity transmittal over long distances which require the use of high tension wires and towers and booster and substation arrays to ensure delivery of adequate power to the consumer.

The transmission of gaseous fuels, such as natural gas, also requires substantial infrastructure to ensure adequate pressure and supply to consumers. Single use and rechargeable cylinders are practicable in some cases but even household size cylinders are bulky and heavy and require regular replacement.

It is an object of the present invention to overcome or ameliorate at least one of the disadvantages of the prior art, or to provide a useful alternative.

The energy generator produces pure gaseous hydrogen by the reduction of water by electro positive half-cell reactions involving two or more electropositive redox systems. The systems are chosen to maximise hydrogen production and desirably to produce by-products which are valuable rather than harmful or useless.

BRIEF DESCRIPTION OF DRAWING FIGURES

DESCRIPTION OF THE INVENTION

Figure 1:
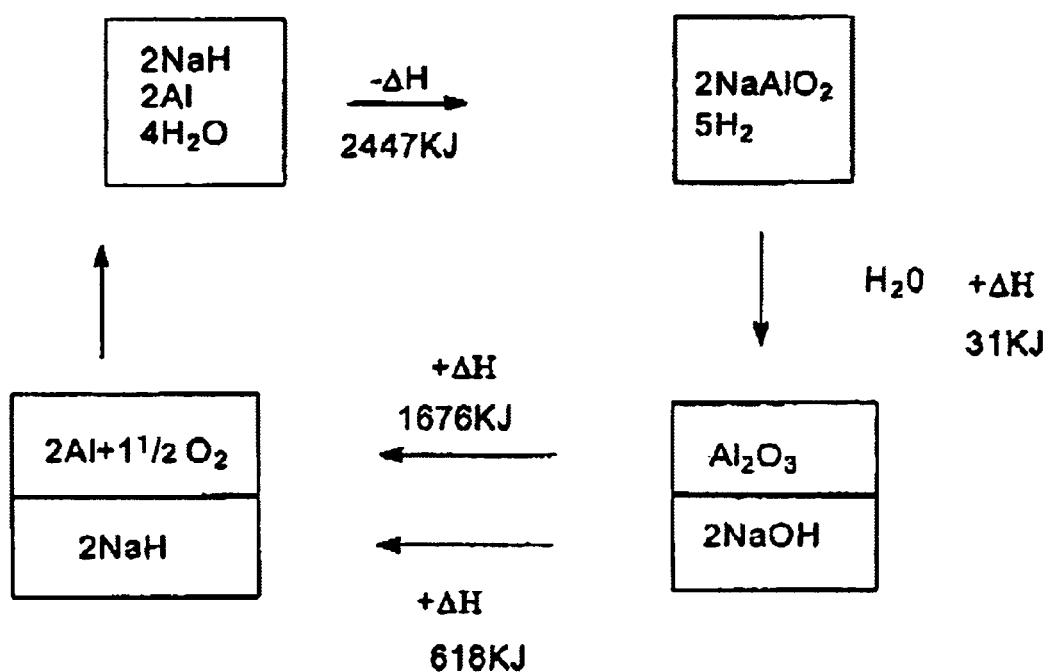
FIG. 1 shows, schematically, a NaH/Al system in accordance with the invention.

According to a first aspect, the invention provides a method for generating hydrogen and/or energy from a chemical reaction including the steps of:

selecting an electronegative half cell reaction producing hydrogen;

selecting a first electropositive half cell reaction having a sufficient potential to drive said electronegative half cell reaction;

selecting a second electropositive half cell reaction;

said first and second electropositive half cell reactions selected in combination with said electronegative half cell reaction to produce an increase in hydrogen and/or energy production from water; and combining said half cell reactions.

This is in contrast to prior art systems which use a single electropositive half cell component in the reaction mixture. Prior art systems which have a single electropositive half cell reaction are often sluggish in the production of hydrogen, and require unacceptably long times to reach completion. This is inherent in the kinetics of the processes themselves.

Disclosed in the prior art, The PowerBall Hydrogen Cell (herein referred to as system A) uses "sodium hydride to react with water producing hydrogen on demand".

The relevant half cell reactions are:

$$2H_2O+2e^- \rightarrow 2OH^- +H_2 \quad E_0=-0.828 \text{ V}$$

$$2H^- \rightarrow H_2+2e^- \quad E_0=+2.23 \text{ V}$$

ADDING:

$$H_2O+2H^- \rightarrow 2OH^- +2H_2 \quad E_0=+1.40 \text{ V}$$

OR $$NaH+H_2O \rightarrow NaOH+H_2 \quad \text{(SYSTEM A)}$$

If a further half cell reaction is added in accordance with the present invention, for instance, if elemental aluminium is added to the reactants used in system A, the resulting equation (system B) becomes:

$$NaH+2H_2O+Al \rightarrow NaAlO_2+2\tfrac{1}{2}H_2 \quad \text{(SYSTEM B)}$$

The results is a 250% increase in hydrogen production for the same amount of sodium hydride. Also, as sodium aluminate generally has a higher dollar value than sodium hydroxide, system B would usually provide a better economical return than system A.

In certain preferred embodiments of the present invention, it may be possible to select the half cell reactions such that the sum of the value of residual materials in the hydrogen cell at the endpoint of the reaction is greater than that of the sum of reactants introduced into the cell.

Preferably, the chemical system is an inorganic chemical system.

Preferably, the second electropositive half cell reaction can also drive the electronegative half cell reaction.

The chemical system may include additional electropositive half cell reactions.

Preferably, the electronegative half cell reaction is: $2H_2O+2e^- \rightarrow 2OH^- +H_2$.

Preferably, the first electropositive half cell reaction is: $2H^- \rightarrow H_2+2e^-$.

Preferably, the second electropositive half cell reaction is: $Al+4OH^- \rightarrow AlO_2^- +2H_2O+3e^-$.

Preferably, the electropositive half cell reactions involve the oxidation of species selected from binary hydrides, ternary hydrides, amphoteric elements, electropositive elements in groups one and two of the periodic table and chelated transition elements. In general, the reductant can be any system having an $E_0$ value greater than +0.83 V when a reductant is written on the left hand side of the ½ cell equation is according to the Latimer convention.

In highly preferred combinations, the half cell reductant is a binary and/or ternary hydride, in combination with an amphoteric element. Amphoteric elements preferred include aluminium, zinc, chromium, gallium and tin. Aluminium is particularly preferred.

Preferably, the reductant in the first electropositive half cell is hypophosphorous acid or dithionite.

The reductant in the first electropositive half cell reaction may also be a metal organic complex capable of changing configuration to release one or more electrons in a realisation of an increased coordination number.

While it will be understood by those in the art that, due to fluctuating commodity prices and local variations in raw materials, it is not possible to give an example which is absolutely definitive, the half cells may preferably be selected such that the products utilised are of small commercial value. For example scrap aluminium, has low commercial value and may be in impure form, (eg waste produced from the purification of steel) and may be converted in accordance with the present invention into products such as $NaAlO_2$ which is a versatile precursor to many useful products and generally has a higher unit value in any given area than a corresponding unit of scrap aluminium.

As an example of the useful products produced, $NaAlO_2$ (useful in itself as for example, a hardener of bricks, in water treatment, for lake and stream restoration, in fabric printing, for milk glass and for soap) can readily be converted into a range of compounds, such as pure $Al_2O_3.3H_2O$, which can be used as an emulsifier, an absorbent, in ion exchange chromatography, in glasses, clays and pottery (whiteware), as an antiperspirant, as a paper whitener, as a dye, in abrasives etc. $Al_2O_3.3H_2O$ can be converted into alumina and back to aluminium by cathodic reduction, producing a metal which is free from contaminating alloying elements such as magnesium and iron. Aluminium itself is also well known for its physical properties, and use in the automotive, electrical and aircraft industries, for packaging foil, dental alloys, explosives, paint etc.

According to a second aspect, the invention provides a method of reversibly storing energy in an inorganic chemical system including the step of providing energy to a product to produce a reactant, said reactant being reactable to produce energy, hydrogen and said product, wherein the reaction of the reactant to the product is an oxidation reaction and represents a first electropositive half cell reaction and is in combination with an electronegative half cell reaction producing hydrogen, and a second electropositive half cell reaction, said first electropositive half cell reaction having sufficient potential to drive said electronegative half cell reaction, the half cell reactions being selected such that hydrogen is produced from water.

It is also preferred that the reactions are selected such that the sum of the value of residual materials in the hydrogen cell at the endpoint of the reaction is greater than that of the sum of reactants introduced into the cell.

The cathodic reduction of alumina according to the equation:

$$Al_2O_3 \rightarrow 2Al + 1\tfrac{1}{2}O_2 + \Delta H$$

requires 1676 KJ per gram mole of alumina or 838 KJ per 27 grams of aluminium. The subsequent reaction of aluminium with sodium hydroxide and the release of the hydrogen energy by, say, combustion, according to the following equations $$NaOH + Al + H_2O \rightarrow NaAlO_2 + 1\tfrac{1}{2}H_2 \quad \Delta H = -424 \text{ KJ}$$

$$1\tfrac{1}{2}H_2 + \tfrac{3}{4}O_2 \rightarrow 1\tfrac{1}{2}H_2O \qquad \Delta H = -427.5 \text{ KJ}$$

gives a total energy recovery of 851.5 KJ per 27 grams of aluminium.

The system

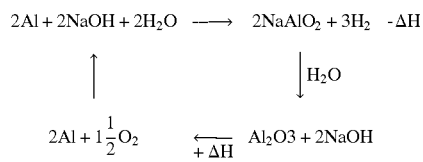

is therefore reversible and 100% energy efficient. An inexhaustible energy source, such as hydroelectric, solar, nuclear, geothermal etc can be used to store energy in an electropositive system, eg aluminium metal and then released in a suitable cell to produce energy on demand. The energy losses through power lines in transmitting from an isolated source can be greatly reduced, or indeed eliminated, by indefinite storage in an electropositive system to be subsequently released in, for an example, alkaline electrochemical cell as described above.

Preferably the reactant is a stable inorganic compound as described in relation to the first aspect, for example, aluminium, and, the energy stored in the reversible system is provided by an inexhaustible source, including but not limited to hydroelectric, solar, nuclear, geothermal, wind and tidal power.

In preferred embodiments, energy is stored with approaching 100% thermodynamic efficiency.

According to a third aspect the invention provides a cell for generating hydrogen and/or energy by combining reactants in a chemical reaction system including:
 an electronegative half cell reaction producing hydrogen;
 a first electropositive half cell reaction having a sufficient potential to drive said electronegative half cell reaction; and
 a second electropositive half cell reaction;
and wherein the first and second electropositive half cell reactions are selected in combination with the other half cell reaction such that hydrogen and/or energy production is increased.

According to a fourth aspect, the invention provides a hydrogen generator including:
 a chemical system which produces hydrogen from water;
 a supporting cathode screen on which the hydrogen overpotential is low, thereby increasing the rate of reaction and subsequent rate of hydrogen generation relative to the rate of reaction in the absence of said cathode screen.

Preferably, the produced hydrogen is capable of forcing aqueous components of the cell out of contact with reactive solid components and into a holding reservoir, thereby resulting in a reduction in hydrogen and heat production.

The generator of the present invention preferably includes an inbuilt heat exchange system that can be used to transfer heat from an exothermic chemical reaction in the cell or control the rate of the exothermic chemical reaction.

Preferably, the hydrogen generator of the present invention comprises a pressure vessel, the size of which will depend on the nature of the application. In the case of say, domestic use in villages, the unit is engineered of high quality reinforced polyester that is desirably portable and robust. A small domestic reactor may include a means for introducing reactants and a means for removing reactants and/or products as a batch process.

Larger centrally located units for producing and distributing greater volumes of hydrogen and heat may use a continuous input of chemicals, introduced in batch mixtures at regular intervals and from which solutions of the value-added products can be removed. The recirculated cooling water may be used to replenish the water used up in the production of hydrogen, thus keeping the reaction temperature high enough to ensure a continuing vigorous reaction.

The present invention also relates to energy storage, release and reversibility, which is herein disclosed in more detail.

BEST MODES FOR CARRYING OUT THE INVENTION

Examples

A schematic diagram is shown in FIG. 1 which shows a NaH/Al system in accordance with the present invention. The figure of 2447 KJ shown in the first step includes the energy liberated by the combustion of hydrogen.

Figure 2:
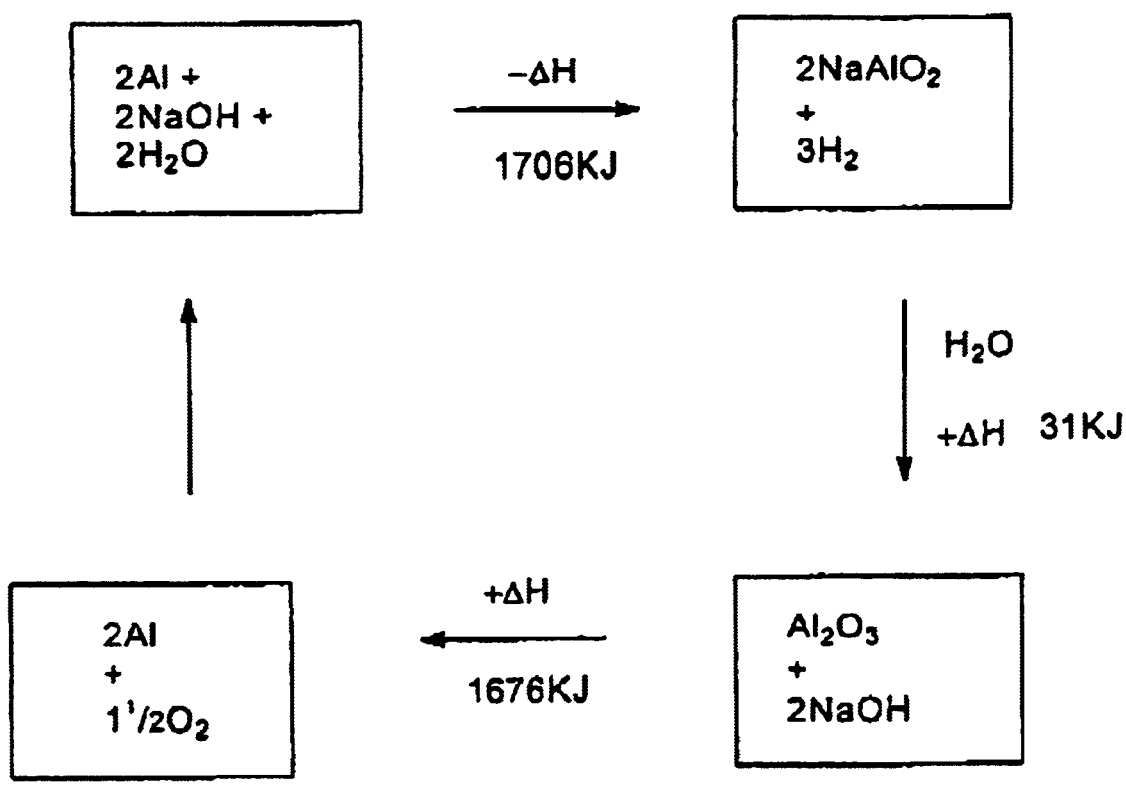
FIG. 2 shows, schematically, another system in accordance with the invention.

FIG. 2 shows another system, which starts from aluminium metal and sodium hydroxide, which is usually less expensive than sodium hydride. The overall energy produced, 1706 KJ also includes the energy obtained through the combustion of hydrogen.

The cell for carrying out the method of the present invention is an alkaline cell, which uses an inert mesh cathode to provide electrons for the reduction of water according to the half cell equation (equation 1) below:

$$2H_2O + 2e^- \rightarrow 2OH^- + H_2 \quad E_0 = -0.828 \text{ V}$$

This is a well-documented electro-chemical reaction which theoretically can be coupled with another half cell reductant having a $E_0$ value greater than $-0.828$ V in order to produce hydrogen. However, the kinetics of the processes sometimes make such combinations impracticably slow.

The present invention describes exceptions to the above, which can be found in the use of binary and ternary hydrides, the amphoteric elements and electropositive elements in groups one and two of the Periodic Table. In some of these instances the mesh cathode does not provide galvanic interaction merely acts as a convenient reaction platform.

The generator of the present invention includes a selection of chemicals, which react with water on a supporting cathode screen. The selection of chemicals have a low hydrogen overpotential, thereby increasing the rate of reaction and subsequent rate of hydrogen generation.

The relevant half cell reactions are:

$$2H_2O + 2e^- \rightarrow 2OH^- + H_2 \quad E_0 = -0.828 \text{ V}$$

$$2H^- \rightarrow H_2 + 2e^- \quad E_0 = +2.23 \text{ V}$$

ADDING:

$$H_2O + 2H^- \rightarrow 2OH^- + 2H_2 \quad E_0 = +1.40 \text{ V}$$

OR $$NaH + H_2O \rightarrow NaOH + H_2 \quad \text{(SYSTEM A)}$$

As mentioned in the specification of the present invention, if elemental aluminium is added to the reactants used in system A, the resulting equation (system B) becomes:

$$NaH + 2H_2O + Al \rightarrow NaAlO_2 + 2\tfrac{1}{2}H_2 \quad \text{(SYSTEM B)}$$

The generator is configured such that the hydrogen produced can build up to a pressure such that it can force the aqueous components of the cell out of contact with the reactive solid components and into a holding reservoir. In this way, the generator can be made self regulating—hydrogen is produced while the aqueous components are in contact with the reactive solids, but as the hydrogen is produced, the aqueous components are forced away from the solids by pressurised hydrogen, thereby resulting in a reduction in hydrogen production. When hydrogen is drawn off, the pressure is released, allowing the aqueous components to come back into contact with the solids and causing the reaction to recommence. The hydrogen can be removed either batchwise, as described above, or in a continuous fashion to regulate hydrogen production. The reactor size and configuration can be selected based on the amount of hydrogen production required.

The generator of the present invention may also include an inbuilt heat exchange system that can be used to transfer heat from an exothermic chemical reaction in the cell or control the rate of the exothermic chemical reaction. The heat exchange system may operate by condensing the steam produced by the direct heating of the water in the aqueous system by the reaction. The heat exchange system may be used for other purposes (eg, domestic heating) or simply as a way of controlling the rate of reaction in the generator. It is known that increasing temperature increases the rate of a reaction.

More preferably, the generator is an alkaline cell which uses an inert mesh cathode to provide electrons for the reduction of water according to the half cell equation:

$$2H_2O + 2e^- \rightarrow 2OH^- + H_2 \quad E_0 = -0.828 \text{ V}$$

said half cell electro-chemical equation being coupled with another half cell reductant for the production of hydrogen. Desirably, the inert mesh cathode consists of platinised titanium to assist anodic corrosion thereby aiding electron transfer from the reductant.

The cathode screen performs a catalytic function and is used to facilitate electron transfer in the system, and has the effect of increasing the rate of the reaction. The screen accepts electrons from the electropositive system and transfers these to the water to a greater rate than would be observed if the electron transfer was only occurring directly from the electropositive system to the water.

A preferred embodiment of the present invention is an energy generator, for the production of pure molecular hydrogen and heat from water by a combination of a number of redox reactions within a reactor, wherein water is reduced to hydrogen using a combination of selectable electropositive redox systems chosen to maximise hydrogen production with concomitant formation of valued by-product(s), said electropositive redox systems being half cell reductant(s), said half cell reductant(s) being coupled with said water reduction for the production of hydrogen, the half cell reductants being chosen to maximise hydrogen production and to produce valued by-products with community usage or commercial value, said half cell reductants including but not limited to binary hydrides, ternary hydrides, amphoteric elements, and electropositive elements in groups one and two of the periodic table and chelated transition elements.

In preference where the half cell reductant is a binary and/or ternary hydride, it is found in combination with an element such as aluminium; where the half cell reductant includes an amphoteric element this is typically aluminium, zinc, chromium gallium or tin.

Another preferred embodiment of the present invention is a hydrogen generator, for the production of pure molecular hydrogen from water by a combination of a number of redox reactions within a reactor, wherein water is reduced to hydrogen using a combination of selectable electro-positive redox systems chosen to maximise hydrogen production with preferably concomitant formation of valuable by-product(s), the generator including a feeder for feeding reactants into said reactor, wherein said feeder may be a cartridge containing normal amounts of selected reactants for introducing chemicals into the reactor; and means for allowing water to be fed gravitationally into the reactor vessel from a separate reservoir.

The preferred embodiment of the generator is able to produce hydrogen on demand by generating increased pressure within the vessel when the hydrogen tap is turned off. This increased pressure forces the liquid from the vessel into a holding tank for return into the generator when the hydrogen tap is turned back on, releasing the pressure. The separation of liquid and solid reactants results in a cessation in energy production.

The generator preferably contains a heat exchange coil through which water is recirculated to condense the steam within the reactor and thus remove the heat produced during the exothermic reaction. Raschig rings may also be used in the volume above the reaction area to condense this steam back into the reaction itself.

Another preferred form of the present invention is a generator for the production of pure molecular hydrogen and heat from water by a combination of a number of redox reactions within a reactor, wherein water is reduced to hydrogen using a combination of selectable electropositive redox systems chosen to maximise hydrogen production with concomitant formation of valuable by-product(s), the generator comprising means for recovering products and/or reactants including liquid by-products or solid components from the reaction vessel, in operation said recovery means facilitating the recovery of valuable by-products either as a solution or sludge from a tap which is preferably located at the base of the generator, solid and liquid by-products being removable through that same tap.

Another preferred form of the present invention is a robust generator, for the production of pure molecular hydrogen and heat from water by a combination of a number of redox reactions within a reactor, wherein water is reduced to hydrogen using a combination of selectable electropositive redox systems chosen to maximise hydrogen production with concomitant formation of valued by-product(s), in this way affording a system that in formation with a series of related units, provides basic essential commodities including means for the provision of heat, electricity and potable water, in additional to valued chemicals for community use or subsequent resale, the generator producing pure non-polluting molecular hydrogen which can be directed to facilitate the production of electricity, potable water of heat, by the connection, in series, of related units.

The means for electricity production preferably includes a fuel cell which is connected to the generator and converts the hydrogen directly into electrical energy; said fuel cell, when connected to a vacuum distillation unit provides the electrical energy to facilitate the production of potable water from impure water sources. Alternatively, the pure hydrogen gas may be used for heating, said heat being generated by the combustion of said pure hydrogen gas.

Another preferred form of the present invention is a generator, for the production of pure molecular hydrogen and heat from water by a combination of a number of redox reactions within a reactor, wherein water is reduced to hydrogen using a combination of selectable electropositive redox systems chosen to maximise hydrogen production with concomitant formation of valued by product(s), affording a system that in formation with a series of related units, is capable of providing basic essential commodities including means for the provision of heat, electricity and/or potable water, in addition to valued chemicals for community use or subsequent resale.

Another preferred form of the present invention is a generator, for the production of pure molecular hydrogen and energy from water by a combination of a number of redox reactions within a reactor, wherein water is reduced to hydrogen using a combination of selectable electropositive redox systems chosen to maximise hydrogen production with concomitant formation of valued by product(s), wherein particular valued chemicals generated are determined by the combination of said half cell reductants and/or reactants fed to the reactor, said generator capable of producing hydrogen from a number of combinations of selectable half cell reductants.

For example, when the half cell reductants used includes sodium hydride in combination with aluminium and water, sodium aluminate is generated as a valued by-product in a reaction which produces 250% of the normal yield of hydrogen.

Alternatively, use of sea water as the water source results in the production of insoluble magnesium salts as the useful by-products. Additionally the amount of hydrogen produced by said generator may be regulated by adjusting either the water flow through the heat exchange coil or mechanically separating the solid and aqueous components within the reaction vessel using the pressure built up by the hydrogen gas.

Whilst the above has been given by way of illustrative example of the present invention many variations and modifications thereto will be apparent to those skilled in the art without departing from the broad ambit and scope of the invention as herein set forth.

What is claimed is:

1. A method for generating hydrogen and/or energy from a chemical reaction including:
    selecting as an electronegative half cell reaction producing hydrogen the half cell reaction $2H_2O+2e^- \rightarrow 2OH^- + H_2$;
    selecting a first electropositive half cell reaction having a sufficient potential to drive said electronegative half cell reaction;
    selecting a second electropositive rate enhancing half cell reaction, the first electropositive half cell reaction and the second electropositive rate enhancing half cell reaction being selected in combination with the electronegative half cell reaction to produce an increase in the rate of hydrogen and/or energy production from water relative to the rate of hydrogen and/or energy production from the separate reactions of the first and second electropositive half cell reactions with the electronegative half cell reaction; and
    combining the first and second electropositive and electronegative half cell reactions.

2. The method according to claim 1 wherein the increase in the rate of hydrogen and/or energy production is accompanied by an increase in the quantity of hydrogen and/or energy production.

3. The method according to claim 1 wherein the first electropositive half cell reaction is: $2H^- \rightarrow H_2+2e^-$.

4. The method according to claim 1 wherein the electropositive half cell reactions involve a species selected from the group consisting of hydrides, amphoteric elements, electropositive elements in Groups I and II of the periodic table, chelated transition elements, oxyacids of phosphorus, and oxyacids of sulfur.

5. The method according to claim 1 wherein the first electropositive half cell reaction has a reduction potential $E_0$ greater than +0.83 V when a reductant is written on the left hand side of the half cell equation according to the Latimer convention.

6. The method according to claim 1 wherein a reductant in the first electropositive half cell is hypophosphorous acid.

7. The method according to claim 1 wherein a reductant in the first electropositive half cell is dithionite.

8. The method according to claim 1 wherein a reductant in the first electropositive half cell is a metal organic complex changing configuration to release at least one electron in realisation of an increased coordination number.

9. The method according to claim 1 wherein the first electropositive half cell reaction involves the oxidation of one of a Group I and a Group II metal.

10. The method according to claim 9 wherein the amphoteric element is selected from the group consisting of aluminium, zinc, chromium, gallium, and tin.

11. The method according to claim 9 wherein the first electropositive half cell reaction is $Mg \rightarrow Mg^{2+}+2_e^-$.

12. The method according to claim 1 wherein reversibility of the reaction approaches 100% thermodynamic efficiency.

13. A cell for generating hydrogen and/or energy from a chemical reaction system including:
    an electronegative half cell reaction of $2H_2O+2e^- \rightarrow 2OH^-+H_2$;
    a first electropositive half cell reaction having a sufficient potential to drive the electronegative half cell reaction; and
    a second electropositive rate enhancing half cell reaction, wherein the first half cell reaction and the second electropositive rate enhancing half cell reaction are selected in combination with the electronegative half cell reaction to produce an increase in the rate of hydrogen and/or energy production from water relative to the rate of hydrogen and/or energy production from the separate reactions of the electropositive half cell reaction with the electronegative half cell reaction.

14. The cell according to claim 13, wherein the chemical reaction system is an inorganic chemical reaction system.

15. The cell according to claim 13 further including additional electropositive half cell reactions.

16. The cell according to claim 13 wherein reactants are fed into the cell intermittently.

17. The cell according to claim 13 wherein reactants are fed into the cell continuously.

18. The cell according to claim 13 wherein the first electropositive reaction is $Mg \rightarrow Mg^{2+}+2e^-$.

19. The cell according to claim 13 wherein the second electropositive half cell reaction is $Al+4OH^- \rightarrow AlO_2^- + 2H_2O+3e^-$.

20. A hydrogen generator including:

a chemical system which is capable of producing hydrogen from water by the method of claim 1;

a supporting cathode screen on which a hydrogen overpotential is low, thereby increasing the rate of reaction and subsequent rate of hydrogen generation relative to the rate of reaction in the absence of said cathode screen.

21. The hydrogen generator according to claim 20 adapted such that the produced hydrogen is capable of forcing aqueous components of the cell out of contact with reactive solid components and into a holding reservoir, thereby resulting in a reduction in hydrogen production.

22. A hydrogen generator according to claim 20 wherein said screen and at least one of the electropositive half cell reactions is selected as a cathodic protector for said screen.

23. A method of storing and releasing hydrogen and/or energy including:

producing a chemical and recharging energy; and releasing energy and/or producing hydrogen according to claim 1, wherein each step is reversible and independently controllable.

* * * * *